United States Patent [19]
Kunishi et al.

[11] Patent Number: 5,504,187
[45] Date of Patent: Apr. 2, 1996

[54] POLYMER GRANULES CONTAINING LITTLE RESIDUAL SOLVENT

[75] Inventors: Noriyuki Kunishi; Masahiro Okamura; Takashi Tsukahara; Masahiro Takahashi, all of Ichihara, Japan

[73] Assignee: Idemitsu Petrochemical Co., Ltd., Tokyo, Japan

[21] Appl. No.: 279,845

[22] Filed: Jul. 26, 1994

[30] Foreign Application Priority Data

Aug. 4, 1993 [JP] Japan ................... 5-211059

[51] Int. Cl.$^6$ ..................... C08F 6/00
[52] U.S. Cl. ............. 528/502; 528/196; 528/193; 528/194; 528/332; 428/402
[58] Field of Search ............. 528/502, 193, 528/194, 196, 332

[56] References Cited

U.S. PATENT DOCUMENTS

| | | | |
|---|---|---|---|
| 3,685,804 | 8/1972 | Stansfield | 528/502 |
| 4,634,761 | 1/1987 | Mendiratta et al. | |
| 5,196,507 | 3/1993 | Totani et al. | 528/502 |
| 5,324,816 | 6/1994 | Khanna et al. | 528/502 |

FOREIGN PATENT DOCUMENTS

| | | |
|---|---|---|
| 0488190 | 6/1992 | European Pat. Off. |
| 470444 | 3/1969 | Switzerland |
| WO87/04637 | 8/1987 | WIPO |
| WO93/12168 | 6/1993 | WIPO |

OTHER PUBLICATIONS

Database WPI, Derwent Publications Ltd., AN 74–81418V; Chemical Abstracts, vol. 81, No. 20, Nov. 18, 1974, p. 50, of JP-A-49 028 642, Mar. 14, 1974.

Patent Abstracts of Japan, vol 16, No. 375 (C–0973), Aug. 12, 1992; Derwent Publications Ltd., AN 92–180932, of JP-A-41 020 133, Apr. 21, 1992.

*Primary Examiner*—James J. Seidleck
*Assistant Examiner*—Terressa Mosley
*Attorney, Agent, or Firm*—Oblon, Spivak, McClelland, Maier & Neustadt

[57] ABSTRACT

Granules collected from a solution of a polycarbonate, an integrated structure of independent fine particles constituting the granules being formed at least on the surfaces of the granules; and a process for preparing the granules of the polycarbonate which comprises the steps of adding a poor solvent to the polycarbonate solution, and then agitation-granulating fine particles of the polycarbonate into the granules, while stirring involving a shear force-imparting function is carried out under heating. According to the present invention, the polycarbonate or the like can be collected from its organic solvent solution as the granules having good drying properties.

14 Claims, 7 Drawing Sheets

FIG. 11

POLYMER GRANULES CONTAINING LITTLE RESIDUAL SOLVENT

BACKGROUND OF THE INVENTION (i) Field of the Invention

The present invention relates to polymer granules having a specific outer surface shape collected from a solvent solution of a polymer, and a process for preparing the same. More specifically, it relates to spherical polymer granules having a specific outer surface shape and containing a less remaining solvent, particularly polycarbonate granules and a process for preparing the same.

(ii) Description of the Related Art

As means for collecting a solid polymer from its organic solvent solution, various techniques have been suggested and put to practical use. In particular, a polycarbonate is usually manufactured by an interfacial polycondensation method, and then often collected as a solid polycarbonate in the form of fine particles, granules formed by the gathering of these fine particles or the like from its organic solvent solution. Most of the various methods for collecting the solid polycarbonate which have heretofore been proposed require specific devices, and so there has not been developed a method for isolating and collecting the solid polycarbonate at a low cost without using the expensive devices. For example, as methods for collecting the above-mentioned polymer, there have been known a method which comprises only adding a poor solvent to a polymer solution (Japanese Patent Publication No. 14474/1967), a method which comprises pulverizing the polymer by a kneader (Japanese Patent Publication No. 15899/1978) and a method which comprises pouring the polymer into warm water, and then pulverizing it (Japanese Patent Application Laid-open No. 74231/1989). However, these methods all require specific facilities, which increases the cost of the facilities and the polymer collection inconveniently.

On the other hand, when the polymer is collected from the organic solvent solution of the polymer, particularly the polycarbonate, a large amount of the solvent usually remains in the solid polymer, and this fact deteriorates the quality and physical properties of a polymer product such as the polycarbonate. In order to solve this problem, various techniques have been disclosed. For example, there has been a method which comprises feeding a polymer solution to the polycarbonate granules to vaporize a solvent (Japanese Patent Application laid-open Nos. 189835/1992 and 226541/1992), but in this method, a dense polycarbonate powder is formed, so that drying characteristics are very poor. If the powder is heated up to about 250° C. so as to improve the drying characteristics, the polymer particles are inconveniently liable to fuse and deteriorate, and the particle diameter of the particles obtained by the continuous operation of this method is merely large, which makes the industrial continuous operation essentially impossible.

In addition, an improved technique of this method has been present in which a poor solvent is poured into a polymer solvent solution, followed by the above-mentioned operation (Japanese Patent Application Laid-open No. 17586/1993). However, also for the particles obtained by the improved technique, it is inconveniently necessary to dry them for a long period of time.

SUMMARY OF THE INVENTION

An object of the present invention is to provide a process for preparing polymer granules, particularly polycarbonate granules having higher drying characteristics than the above-mentioned conventional collection methods.

Another object of the present invention is to provide polymer granules, particularly polycarbonate granules having much higher drying characteristics than those of polymer powders obtained by the above-mentioned conventional collection methods.

The present inventors have intensively researched to solve the above-mentioned problems, and as a result, it has been found that specific polymer granules obtained by specifying characteristics of shape of the surfaces or the wholes, size and the like of the collected polymer granules can solve the above-mentioned problems. In addition, it has also been found that these problems can be solved by specific stirring and granulation under specific conditions. In consequence, the present invention has been completed on the basis of this knowledge.

That is to say, the gist of the present invention are as follows:

(1) Polymer granules collected from a solvent solution of a polymer, at least the surfaces of said granules having an integrated structure of independent fine particles of the polymer.

(2) Polymer granules collected from a solvent solution of a polymer, said granules being formed by causing fine particles of the polymer to cohere, while the morphology of the fine particles is maintained.

(3) The polymer granules collected from a solvent solution of a polymer according to the above-mentioned paragraph (1) or (2) wherein a sphericalness of the granules is in the range of 0.8 to 1.0 in terms of Wadell's shape factor.

(4) The polymer granules collected from a solvent solution of a polymer according to the above-mentioned paragraph (1) or (2) wherein a weight distribution of the granules to a particle diameter (X mm) is represented by the formula (I)

$$D(X) = \frac{1}{\sigma\sqrt{2\pi}} \int_{-\infty}^{x} \exp\left(\frac{-(X - X_{bar})^2}{2\sigma^2}\right) dX \quad (I)$$

and this distribution is such that Ef (measurement numbers =n) represented by the formula (II)

$$Ef = \frac{\Sigma(D(X)_{calc} - D(X))^2}{n} \quad (II)$$

is $3 \times 10^{-4}$ or less which substantially corresponds to a normal distribution, and the granules have a standard deviation $\sigma \leq 0.5$ and $0.3 \leq$ bulk density (g/cc) $\leq 0.7$.

(5) The polymer granules according to the above-mentioned paragraph (1) or (2) wherein a particle diameter of the fine particles of the polymer is in the range of 0.001 to 0.2 mm.

(6) The polymer granules according to the above-mentioned paragraph (1) or (2) wherein a specific surface area of the granules of the polymer is in the range of 1 to 100 m²/g.

(7) The polymer granules according to any one of the above-mentioned paragraphs (1) to (4) wherein a particle diameter of the granules of the polymer is in the range of 0.5 to 5 mm.

(8) The polymer granules according to any one of the above-mentioned paragraphs (1) to (4) wherein a bulk density of the polymer granules is in the range of 0.3 to 0.7 g/cc.

(9) The polymer granules according to the above-mentioned paragraphs (1) or (2) wherein the polymer has an ester bond on its main chain.

(10) The polymer granules according to the above-mentioned paragraph (9) wherein the polymer having the ester bond on the main chain is a polycarbonate.

(11) A process for preparing polymer granules which comprises the steps of adding a liquid poor solvent or a vaporized poor solvent to a solvent solution of the polymer, or then agitation-granulating fine particles of the polymer into the granules, while stirring involving a shear force-imparting function is carried out under a heated atmosphere.

(12) A process for preparing polymer granules which comprises the steps of adding a liquid poor solvent or a vaporized poor solvent to a solvent solution of the polymer, carrying out stirring involving a shear force-imparting function under a heated atmosphere to form fine particles of the polymer, and then agitation-granulating the granules of the polymer.

(13) The process for preparing polymer granules according to the above-mentioned paragraph (11) or (12) wherein the amount of the poor solvent to be used is such as to be a poor solvent amount×100/{a polymer solution amount ×(1−a polymer solution concentration (%)/100}=5 to 80.

(14) The process for preparing polymer granules according to the above-mentioned paragraph (11) or (12) wherein the poor solvent is n-heptane.

(15) The process for preparing polymer granules according to the above-mentioned paragraph (11) or (12) which imparts a shearing force having a shear rate in the range of 10 to 80 m/m.sec.

(16) The process for preparing polymer granules according to the above-mentioned paragraph (11) or (12) wherein the formation of the fine polymer particles by the stirring involving the shear force-imparting function and agitation-granulation are carried out in the same granulating vessel.

(17) The process for preparing polymer granules according to the above-mentioned paragraph (11) or (12) wherein the granulation of the fine polymer particles by the stirring involving the shear force-imparting function and agitation granulation are carried out in a granulating vessel having a single or a double helical rotating blade.

DETAILED DESCRIPTION OF THE INVENTION

Examples of a polymer to be handled in the present invention mainly include polymers obtained by a polycondensation reaction using a solvent, such as polycarbonates, polyarylates, polyesterpolycarbonates and polyamides. Above all, polycarbonates and polyarylates are most suitable.

The polycarbonate can be obtained by a usual polycondensation reaction, and in the concrete, it can easily be manufactured by reacting a divalent phenol with phosgene or a carbonate compound.

Examples of the divalent phenol include hydroquinone, 4,4'-dihydroxydiphenyl, bis(4-hydroxyphenyl)alkanes (e.g., bisphenol A and the like), bis(4-hydroxyphenyl)cycloalkane, bis(4-hydroxyphenyl) oxide, bis(4-hydroxyphenyl) sulfide, bis(4-hydroxyphenyl)sulfone, bis(4-hydroxyphenyl) ketone, and halogen-substituted compounds thereof.

Furthermore, examples of the carbonate compound include diaryl carbonate such as diphenyl carbonate, and dialkyl carbonates such as dimethyl carbonate and diethyl carbonate.

A preparation method of the polycarbonate in accordance with a polycondensation process will briefly be described with reference to its typical phosgene method. As a most usual procedure, bisphenol A is reacted with phosgene in the presence of a catalyst such as a tertiary amine (triethylamine or the like) in an inert solvent such as methylene chloride, thereby obtaining the polycarbonate.

On the other hand, the polyarylate can be obtained by a usual polycondensation reaction, and it can be easily manufactured by reacting a divalent phenol with a chloride of an aromatic polybasic acid such as terephthalic acid dichloride or isophthalic acid dichloride.

Examples of the usable divalent phenol are as enumerated above.

For the preparation of the polyesterpolycarbonate, the above-mentioned technique regarding the polycarbonate can be directly applied.

The polyamide (particularly an aromatic polyamide) can be obtained by polycondensing an aromatic dicarboxylic acid chloride and an aromatic diamine in a polar solvent such as dimethylacetamide under moderate conditions such as room temperature.

A good solvent which can be used in the present invention is an organic solvent, and needless to say, it must be capable of dissolving the target polymer. However, the good solvent is required to be substantially inert to the polymer and to be substantially stable at temperatures in a polymer collection step and a solvent purification and recovery step.

In view of the removal of the organic solvent from the polymer granules in the polymer collection step, the preferred organic solvent has a boiling point of 200° C. or less. Examples of the usually suitable organic solvent include chlorine-based organic solvents such as methylene chloride, chloroform and chlorobenzene, dioxane and tetrahydrofuran. They can be used singly or in the form of a mixture of two or more thereof.

The above-mentioned organic solvent are required to have characteristics as the good solvent for the polymer and required to be easily separated and volatilized from the polymer granules collected from the solution. However, it is difficult that these requirements are compatible. Thus, investigations have been made into a relation among the separation properties, the drying properties and the shape of the polymer to be collected, and as a result, it has been found that spherical granules are excellent which can be formed by integrating many fine polymer particles of a small diameter, keeping up the shape of these fine particles. The force by which the integrating state is maintained is not definite, but it can be presumed that the polymer granules come in wet contact with each other when the organic solvent is present, and they are dried as they are and an adhesive state among the particles is maintained. At the time of this integration, it can be supposed that such an external force as to crush the fine particles of the polymer having the small diameter is not applied, and this supposition can be supported by an actual observation that voids remain in the granules formed by the integration.

This state can well be understood from photographs of the surface and section of the granules by an electron microscope (refer to examples and comparative examples).

Furthermore, the polymer granules can also be formed by a cohesive force among the fine particles of the polymer having the small diameter, while the morphology of the fine particles of the polymer is kept up. When the formation of the polymer granules is done by this cohesive force, the deformation of the respective fine particles can be prevented, and it can also be prevented that the surfaces of the particles are completely molten and the adjacent particles are integrated. Therefore, on the surfaces of the granules formed by the cohesion of the fine particles, the spherical portions of the respective fine particles remain and so the rough surfaces are formed, as described above. Thus, the granules have a large outer surface area.

The granules formed by the integration or the cohesion are nearly spherical, and they have a sphericalness of 0.8 to 1.0 in terms of Wadell's shape factor. As the sphericalness is high, the handling properties of the granules are good, which is convenient at the time of molding.

In addition, the high sphericalness conveniently leads to the improvement of a powder filling efficiency and bulk density as well as the uniform dispersion of various additions and a pigment.

The weight distribution of the granules formed by the integration or the cohesion to a particle diameter (X mm) can usually be represented by the above-mentioned formula (I), and this distribution is such that Ef (measurement numbers= n) represented by the formula (II) is $3 \times 10^{-4}$ or less which substantially corresponds to a normal distribution. The polymer granules have a standard deviation $\sigma \leq 0.5$ and $0.3 \leq$ bulk density (g/cc) $\leq 0.7$. Also in view of these points, the handling properties of the granules regarding the present invention are good, which is convenient to handle the granules at the time of the molding. Since the particle diameter distribution is narrow as denoted herein, segregation scarcely occurs during transport, and the additives and the like can uniformly be mixed conveniently. Furthermore, since neither a fine powder nor a coarse powder is present, the uniformity of the granules can easily be maintained at the time of compound or alloying, and the fine powder can be prevented from flying about at the time of throwing the granules into a hopper.

The outer diameter of the granules formed by the integration or the cohesion is preferably in the range of 0.5 to 5 mm so as to improve the volatilization of the solvent, and the average outer diameter of the fine particles constituting the granules is preferably in the range of 0.001 to 0.2 mm.

The specific surface area of the polymer granules which is a factor for similarly improving the volatilization of the solvent is preferably in the range of 1 to 100 $m^2/g$.

The bulk density which depends upon the aggregation state of the fine particles is preferably in the range of 0.3 to 0.7 g/cc for the sake of vaporizing/removing a solvent and for the convenience of the transfer and transport of the powder.

Next, a process for preparing the polymer granules regarding the present invention will be described in more detail.

Together with a polymer solution used to obtain the polymer granules of the present invention, a poor solvent is used in order to improve the collection of the polymer from a good organic solvent solution of the polymer (to improve the formation of the fine particles and to decrease the amount of the remaining solvent). Examples of the poor solvent include aromatic compounds such as benzene, toluene and xylene, alkanes such as pentane, hexane, heptane and octane, ketones such as acetone and methyl ethyl ketone, and mixtures thereof.

The poor solvent can be fed in the form of a liquid or a vapor obtained by vaporizing the solvent. With regard to the feed timing of the poor solvent, the poor solvent may be mixed with the organic solvent solution of the polymer prior to the feed of the organic solvent solution to a granulating vessel, or the poor solvent may be fed separately from the organic solvent solution. For example, the poor solvent may be fed along the wall of the granulating vessel, while the organic solvent solution of the polymer placed in the granulating vessel is stirred. When the poor solvent is abruptly added to the organic solvent solution of the polymer, the abnormal solidification of the polymer easily takes place, and so it is most preferable to slowly and uniformly add the same with stirring.

No particular restriction is put on the amount of the poor solvent, so long as it is not so much as to precipitate the polymer. However, the amount of the poor solvent, i.e., a value (%)=a poor solvent amount/(a polymer solution amount×{1–a polymer solution concentration})×100 is preferably in the range of 5 to 80% by weight, more preferably 10 to 70% by weight. If the amount of the poor solvent is less than 5% by weight, the moldability of the fine powder (the fine particles) is still poor as in a conventional case, and the volatilization of the solvent from the collected polymer cannot be improved unpreferably. Conversely, if it is more than 80% by weight, the bulk density of the formed polymer granules deteriorates unpreferably.

The concentration of the good organic solvent solution of the polymer is selected in the range of 3 to 60% by weight, preferably 10 to 50% by weight. If the concentration of the good organic solvent solution is less than 3% by weight, the amount of the solvent to be collected increases and the efficiency of the whole polymer granules manufacturing process deteriorates, so long as the solution is not beforehand suitably concentrated. Conversely, if it is more than 60% by weight, the viscosity of the solution rises, so that the solution does not flow unless a high temperature or a high pressure is given and so it is difficult to feed the solution to the granulating vessel.

Nevertheless, as a procedure of feeding the good organic solvent solution of the polymer at a high concentration, the solution having a lower concentration can be heated, and then fed, while flashed. In this case, if overheated, the polymer gives rise to heat deterioration, and therefore the temperature of the organic solvent solution must be selected with care. With regard to the methylene chloride solution of the polycarbonate, if its temperature is in excess of 250° C., the heat deterioration of the polycarbonate undesirably commences. In consequence, the temperature of the organic solvent solution is preferably 200° C. or less, more preferably 180° C. or less. When heated, the polymer solvent solution is preferably pressurized at least in a heater portion in order to inhibit the solvent from vaporizing and foaming in a feed pipe, and the solution is preferably flashed in the granulating vessel or at a position as close as possible to the granulating vessel.

Figure 1:
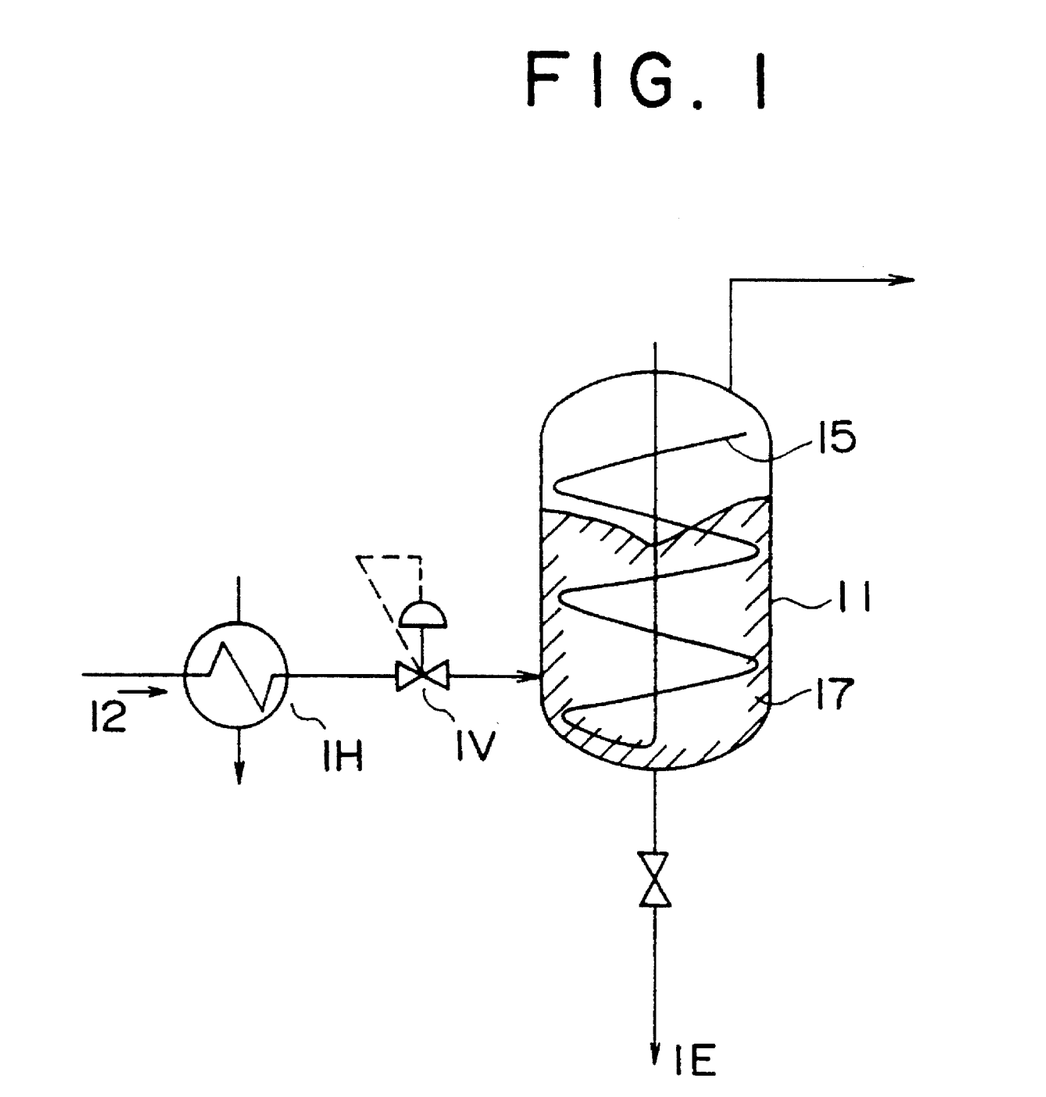
FIG. 1 shows a granulating apparatus which can be used to feed a polymer solvent solution having a high concentration.

This one example is shown in FIG. 1. A polymer solvent solution 12 in a granulating vessel 11 equipped with a stirring blade 15 is heated by a heater 1H, and in this case, the pressure applied to the polymer solvent solution 12 is preferably increased by slightly closing a valve IV. Reference numeral 17 is a layer of the fine particles, and 1E is an outlet of the granules.

In this connection, if a horizontal stirring machine is used, the solution is preferably fed to a mating portion of the stirring machine in that shear force can be given to the polymer solution.

In the granulating vessel, the polymer organic solvent solution and the poor solvent are stirred to form the fine particles of the polymer, and these fine particles are then agitation-granulated to become polymer granules. In this case, the stirring must be carried out under a heated atmosphere and must involve a shear force-imparting function. These requirements are necessary to inhibit the formed fine particles from becoming the granules having a large diameter as they are, to always maintain a certain particle diameter, and to obtain the granules having a desired small diameter.

In addition, the stirring operation under the heated atmosphere is necessary to obtain the granules comprising the independent particles having the small diameter. If the atmosphere is not heated, it can be considered that the solution is unchanged and the granules having the small diameter cannot be formed, though the fine particles are dispersed.

A device involving such a function is equipped with a shearing blade or paddle, and as the shearing blade, a paddle blade and a helical blade can be used. In addition, a kneader and a horizontal stirring machine can also be used.

The granulation is carried out under heating, and so a granulating apparatus itself is preferably provided with a jacket so that steam heating, hot water heating or oil heating may be carried out.

In order to form the fine particles by means of the above-mentioned stirring machine, it is necessary that the stirring machine involves a shear force-imparting function, but no particular restriction is put on the strength of the shear force.

This shear force depends upon a shear rate $F=V/dc$ m/m.sec wherein dc (m) is a clearance between the blade and the wall surface of the stirring machine, and V (m/s) is a relative velocity. Thus, this shear rate is preferably in the range of 10 to 80 m/m.sec, more preferably 20 to 80 m/m.sec. If the shear rate is less than 10 m/m.sec, the polymer to be collected becomes solid masses instead of the fine particles (powder), and in consequence, it is difficult to form the fine particles. Conversely, if it is more than 80 m/m.sec, an excessive machine driving power is required, and any particular advantages are not present. In the case of a vertical stirring vessel equipped with a helical stirring machine, an outer periphery velocity V of the helical blade to the stationary wall surface of the stirring vessel can be employed, and in the case of a stirring vessel equipped with a twin-screw stirring machine, a relative velocity V at the tip of each blade can be employed. A value in the above-mentioned preferred shear rate range should be met at a position through which the polymer solvent solution is fed to the vessel, for example, a position through which the polymer solvent solution is directly added to the fine particles in the vessel.

An operation temperature at which the granulating operation is carried out by the use of the above-mentioned granulating vessel is preferably higher than a boiling point of the solvent of the polymer solvent solution. If the operation temperature is less than the boiling point of the solvent, a removal efficiency of the solvent is low, and what is worse, the granulation itself of the polymer is difficult.

An operating pressure is most preferably in the range of $-500$ mmHg to 10 KgG/cm$^2$. If the operating pressure is less than $-500$ mmHg, a decompression device is aggrandized, and conversely if it is more than 10 KgG/cm$^2$, a vessel of high pressure type is necessary. Both the cases are disadvantageous from the viewpoints of cost and the like.

No particular restriction is put on a feed position of the polymer solvent solution to the granulating vessel, so long as the solid content of the polymer does not abnormally adhere to the blade of the stirring machine and the inside wall of the vessel. However, most preferably, a feed opening for the polymer solvent solution is positioned so that the polymer solvent solution may be fed into the layer of the fine particles for the purpose of exerting a self cleaning effect by the polymer fine particles (powder). In this case, the feed opening tends to be closed with the polymer fine particles which are being stirred, depending upon an opening direction of the feed opening, and therefore the opening direction should be decided in consideration of a flow direction of the fine particles under the stirring.

Furthermore, in order to prevent the feed opening for the polymer solvent solution from being closed, or in order to impart the suitable shear force to the produced fine particles, it is most preferable in point of the shear force imparting effect that the polymer solvent solution is fed to a position at which the shear rate is maximum.

The fine particles of the polymer having a small diameter which have been formed by the above-mentioned procedure, suffering from the predetermined shear force, are then agitation-granulated to become the granules having a large diameter. The agitation granulation is carried out after the previous stirring granulation step, or simultaneously with this step.

As a device for the agitation granulation, a stirring machine having a helical blade or a paddle blade is preferable in the case of the vertical vessel, and a kneader or a disc type stirring machine is usable in the case of the horizontal vessel.

The agitation granulation comprises only agglomerating the fine particles to form the granules having a large diameter, while the original shape of the fine particles is maintained to the utmost. Therefore, a little power is required, and about 0.1 to 5 Kw/m$^3$.hr is enough. A residence time is preferably in the range of 0.1 to 10 hours, more preferably 0.2 to 5 hours. If the residence time is less than 0.1 hour, the granulation cannot sufficiently proceed, and even if it is more than 10 hours, any additional effect cannot be obtained.

The granulation of the granules can be carried out immediately after the granulation step of the fine particles, or alternatively by adding a binder newly. That is to say, if the solvent does not completely volatilize in the previous particles formation step, the surfaces of the fine particles are still in a wet state, and these fine particles can be integrated or cohered by the agitation granulation. However, if the solvent has been substantially completely volatilized, it is preferable to add the binder thereto.

As this binder, there can be used one or a mixture of methylene chloride and n-heptane which can be used as the good solvent or the poor solvent. The binder can be used in the state of a liquid or a vapor obtained by vaporizing the same.

In the case that methylene chloride is used singly or together with the poor solvent, the content of methylene chloride in the fine particles is preferably in the range of 2 to 25% by weight, more preferably 3 to 20% by weight. If the content of methylene chloride is less than 2% by weight, the sufficient cohesive effect of the fine particles cannot be obtained, and if it is more than 25% by weight, the surfaces of the particles are dissolved, so that the specific surface area on each surface of the formed granules lowers and the drying properties of the particles decline, and in consequence, the desired effect of the present invention cannot be achieved.

On the other hand, in the fine particles of the polycarbonate, the content of the poor solvent which may be used together with the binder is preferably in the range of 1 to 50% by weight, more preferably 2 to 40% by weight. If the content of the poor solvent is less than 1% by weight, methylene chloride which is mixed and used partially dissolve the surfaces of the formed granules unpreferably. Conversely, if it is more than 50% by weight, the cohesive effect of the fine particles is impaired, and the poor solvent is liberated from the polycarbonate fine particles with the result that it is present in a liquid state, so that there occurs a problem that the handle of the fine particles is complex.

As the binder, methylene chloride alone or a mixture of methylene chloride and the poor solvent is treated under such conditions that the content of the binder is in the above-mentioned range, but as a preferable treatment procedure, a method of adding the binder to the fine particles of the polycarbonate which is being stirred, for example, a method of uniformly spraying the binder from one upper position or several upper positions during the stirring is simplest and effective. The feed rate of the binder is preferably in the range of 0.1 to 30% by weight of the fine particles per hour. If the feed rate of the binder is less than 0.1% by weight, a treatment time is long, which is not efficient. If it is in excess of 30% by weight, large cohered masses are formed, and the surfaces of the fine particles are liable to be dissolved by methylene chloride.

A treatment temperature is preferably in the range of 20° to 200° C. so that the solvent content in the fine particles may be in the above-mentioned range, depending upon the kind of used solvent. In this case, if the treatment temperature is less than 20° C., a treatment efficiency is low, and conversely, if it is in excess of 200° C., the polymer is liable to deteriorate.

In order to make the solvent content in the polymer constant, it is most preferable that the temperature of the fine particles is set to a boiling point or more of at least one of the good solvent and the poor solvent, and the treatment is then carried out, balancing between the feed of the solvent and the amount of the vaporized solvent.

Since the polymer granules formed by the integration or the cohesion usually contains 0.1 to 60% by weight of the solvent, it is necessary to dry the granules. The drying can be achieved by the passage of an inert gas of $N_2$, Ar, $CO_2$ or the like or the utilization of vacuum, or a combination of these means.

A drying temperature is preferably in the range of 50° to 220° C., more preferably 60° to 180° C., most preferably 80° to 180° C. If the drying temperature is less than 50° C., a drying efficiency is poor, and if it is in excess of 220° C., the granules undesirably fuse to each other to easily form blocks.

As the type of the drying machine to be used, a hopper type stirring machine, a horizontal stirring machine, a vertical stirring machine and the like can be used. Above all, the stirring type is preferable, because this type can prevent the fusion between the granules and permits the drying temperature to fairly rise.

The formation of the polymer fine particles having a small diameter and the granulation of the polymer granules having a large diameter may be carried out in different devices or the same device.

In the case that the formation of the polymer fine particles and the granulation of the polymer granules are carried out in the same device, a vertical stirring machine (a blade type is a helical type or a paddle type) or a horizontal stirring machine is most preferable. In the case that the above-mentioned treatments are carried out by the same device, a shear rate F which depends upon a relative velocity V (m/m.s) between the blade and a vessel wall or between the blades and a clearance dc (m) is preferably in the range of 10 to 80 m/m.s, more preferably 20 to 80 m/m.s.

In the case that the above-mentioned treatments are carried out by the same device, the beforehand prepared fine particles of the same polymer may be placed in the granulating vessel for the purpose of improving the transmission of heat necessary to vaporize the solvent and the poor solvent and so as to immediately obtain the product. In the case that the fine particles are not beforehand placed in the granulating vessel, the fine particles formed by carrying out this granulation method can be used as they are, and thus such a procedure is convenient for a continuous production.

The polymer granules obtained by the process described above have the following features.

(1) The thus obtained granules have a specific surface area of 1 to 100 m²/g. The practically preferable specific surface area is in the range of 5 to 50 m²/g.

(2) The thus obtained granules lave a bulk density of 0.3 to 0.7 g/cc. The practically preferable bulk density is in the range of 0.4 to 0.6 g/cc.

In collecting a polymer in a fine state from an organic solvent solution of the polymer, fine particles can be formed by a stirring operation involving a predetermined shearing force in a granulating vessel, and these fine particles can then be integrated or cohered in the same or a different granulating vessel, whereby spherical granules having excellent drying properties and a high bulk density can be successfully obtained.

Now, the present invention will be described in more detail with regard to examples, but the scope of the present invention should not be limited to these examples.

EXAMPLE 1

A polycarbonate (trade name TOUGHLON A2200, made by Idemitsu Petrochemical Co., Ltd.) as a polymer was dissolved in methylene chloride (Hiroshima Wako Pure Chemicals Co., Ltd.; the highest quality) to form a methylene chloride solution containing 22% by weight of the polycarbonate. Next, 25% by weight of n-heptane (to methylene chloride) as a poor solvent was added to the solution to obtain a solution for the preparation of fine particles of the polymer. A vertical granulating vessel 21 (FIG. 2) having an effective volume of about 8 liters and having a double helical blade 25 was prepared. In addition, this granulating vessel was provided with a jacket for hot-water heating (not shown).

Figure 2:
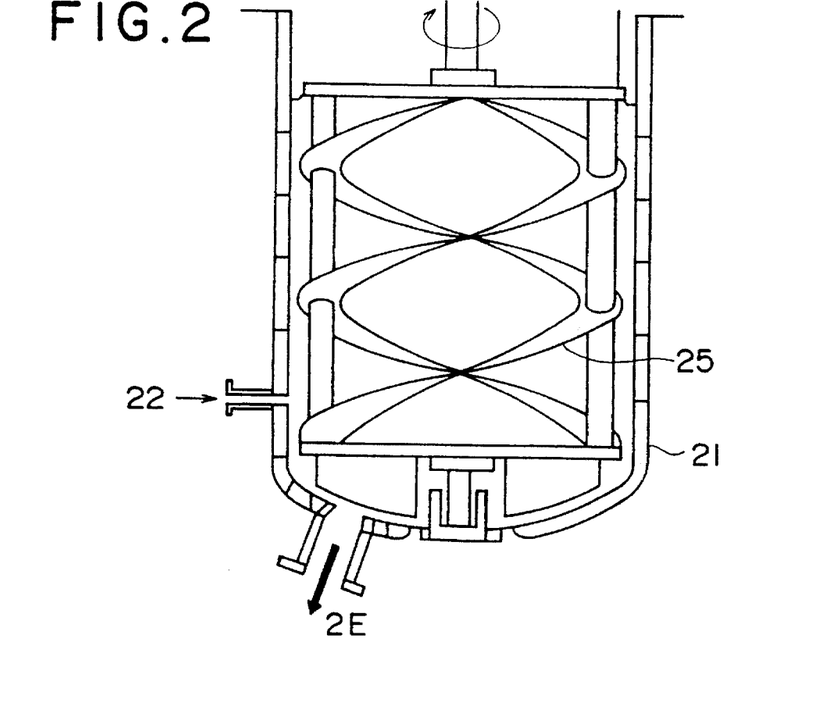
FIG. 2 shows a granulating vessel equipped with a double helical stirring blade.

The interior of this vessel was heated up to 80° C., and the polycarbonate solution 22 was then fed at a flow rate of 800 g/hr to the vessel in which a stirring blade was being rotated at 120 rpm. The feed of the polycarbonate solution was carried out through a lower position of the vessel so that the polycarbonate solution might undergo shearing of the stirring blade. At this time, a shear rate which the stirring blade had was 36 m/m.sec. After a short time from the start of the feed, the fine particles of the polycarbonate began to be produced. The operation was further continued, so that the temperature of the powder in the vessel became about 50° C. and the fine particles began to cohere, and at a time when an average particle diameter of 1.3 mm (granules having a large diameter) has been reached, it was confirmed that the system became stable. The reason why this good stability is attained is not definite, but it can be presumed to be because the stirring blade is a double helical type and so a stirring performance is high.

Under the above-mentioned conditions, the operation was further continued for 6 hours, and when the level of the granules rose above the half level of the vessel, the granules were intermittently drawn through an outlet 2E of the vessel so that the level of the granules might be constant, and the operation was additionally carried out for 20 hours. Even after the produced granules began to be drawn, the continuous operation was possible in condition that the temperature of the granules and the particle diameter were always stable.

The thus obtained granules were dried by an oven at 120° C., and according to measurement by a weight method, the content of the solvent in the granules was 36% by weight. In addition, these granules were dissolved in dichloroethane, and a composition of the contained solvents was analyzed in a usual manner. It was apparent that 19% by weight of methylene chloride and 17% by weight of n-heptane were present in the above-mentioned 36% by weight of the solvent. Next, the obtained granules were placed in a drying container having a volume of 200 ml, and they were then dried at 135° C. for about 2 hours under a nitrogen stream. At this time, the contents of the solvents in the granules were measured, and as a result, the contents of methylene chloride and n-heptane were 10 weight ppm or less and 30 weight ppm or less, respectively. From these results, it was apparent that the granules showed very excellent drying properties.

Figure 11:
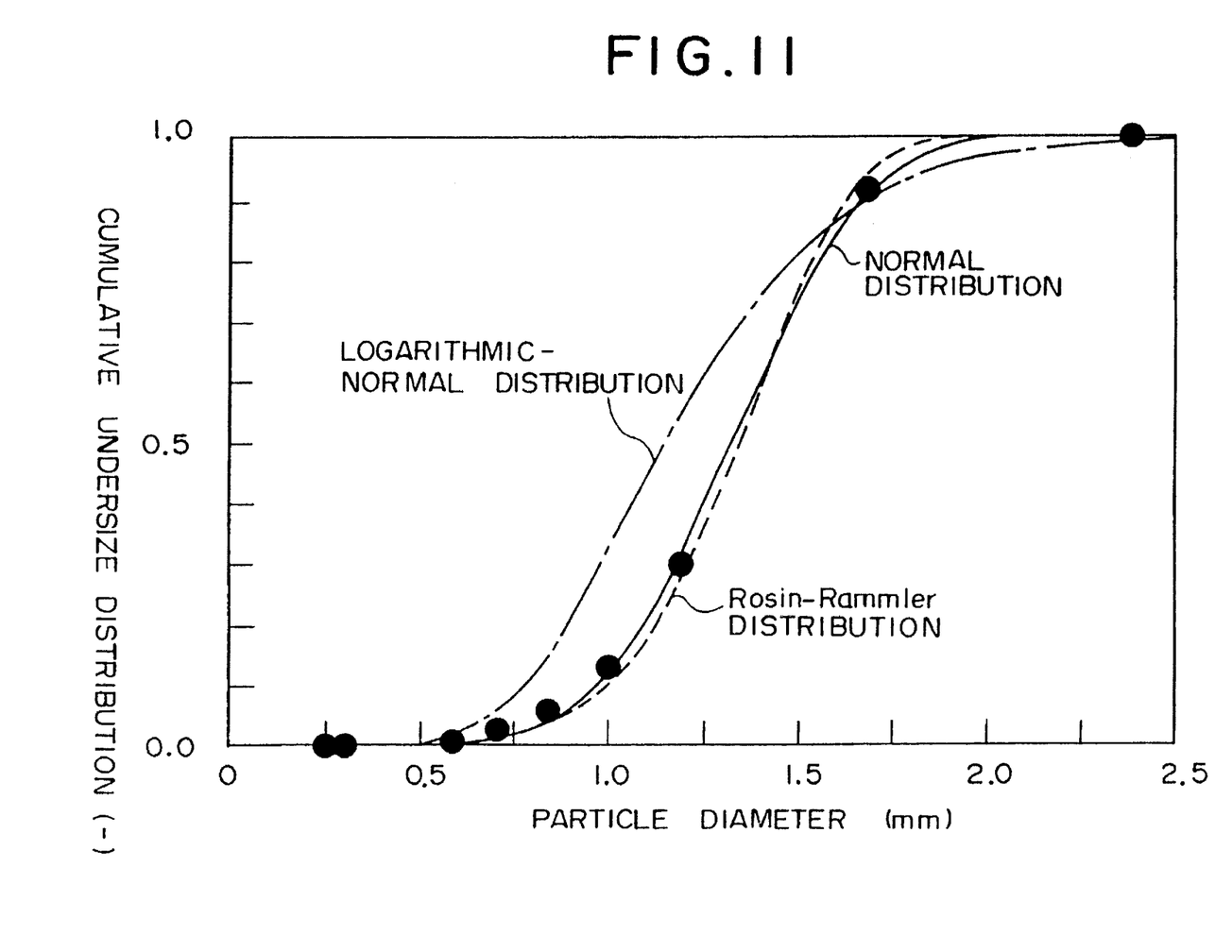
FIG. 11 shows a particle diameter distribution of the granules prepared in Example 1 and its function curve.

The thus dried granules were sifted to measure a weight distribution of the granules every particle diameter, and a distribution curve was made on the basis of the thus measured values. Afterward, a correlation was established so that a gap (a deviation) between the thus made curve and each function curve of various particle distribution functions might be minimized, and a constant was determined so as to most match with the correlation by a non-linear least square method. FIG. 11 shows a correlation between the measured values and curves (a solid line, a dotted line and a chain line) showing the various distribution functions. In the same drawing, circular black symbols denote the measured values, and the solid line denotes a normal distribution (an average diameter $X_{bar}$= 1.31948, $\sigma$=0.26957), the dotted line denotes a Rosin-Rammler distribution (K=0.103791, n=6.48573) and the chain line denotes a logarithmic normal distribution (an average diameter $X_{bar}$=1.14205, $\sigma$=1.35115).

The above-mentioned Rosin-Rammler distribution is a distribution in which a cumulative undersize distribution is represented by the following formula (III):

$$1-R(X)=1-exp(-KX^n)$$

wherein X is a particle diameter; R(X) is a cumulative oversize distribution; and K and n are constants.

In addition, the logarithmic normal distribution is a distribution in which a cumulative undersize distribution is represented by the following formula (IV) and (V):

$$D(X) = \frac{1}{\sqrt{2\pi}} \int_{-\infty}^{t} \exp\left(\frac{-t^2}{2}\right) dt \qquad \text{(IV)}$$

$$t = \frac{\ln X - \ln X_{bar}}{\ln \sigma} \qquad \text{(V)}$$

wherein $X_{bar}$ is an average diameter; and $\sigma$ is a standard deviation.

As a result of the investigation of the foregoing, it was apparent that the normal distribution curve most matched. In addition, an error function value Ef (n) at this time was $1.23\times10^{-4}$ (–).

Figure 7:
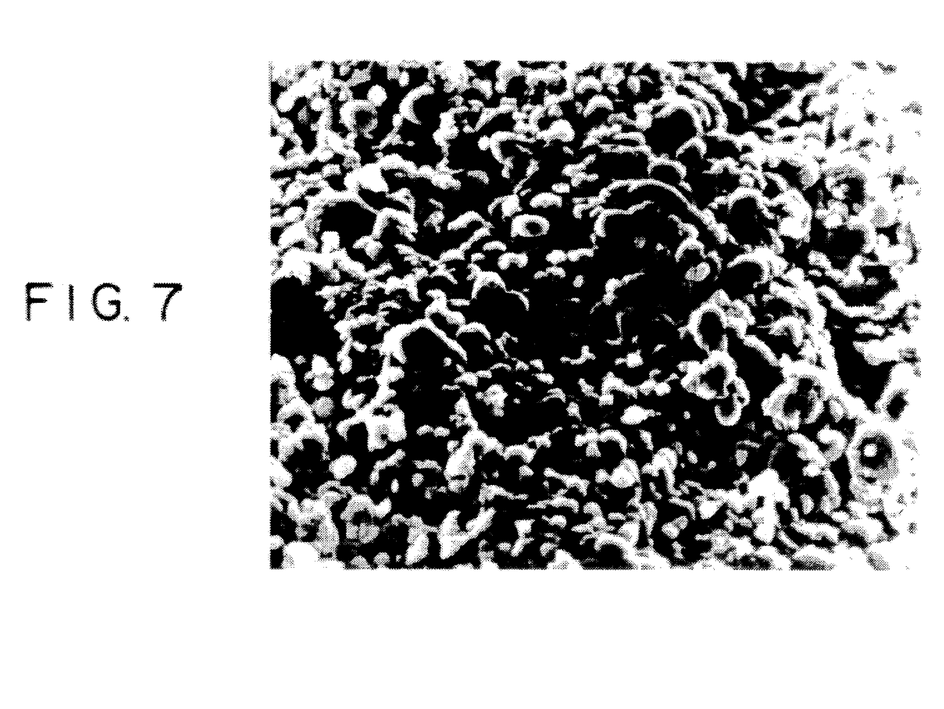
FIG. 7 shows an electron microscope photograph (×1,000) of each surface of granules obtained in Example 1.
Figure 8:
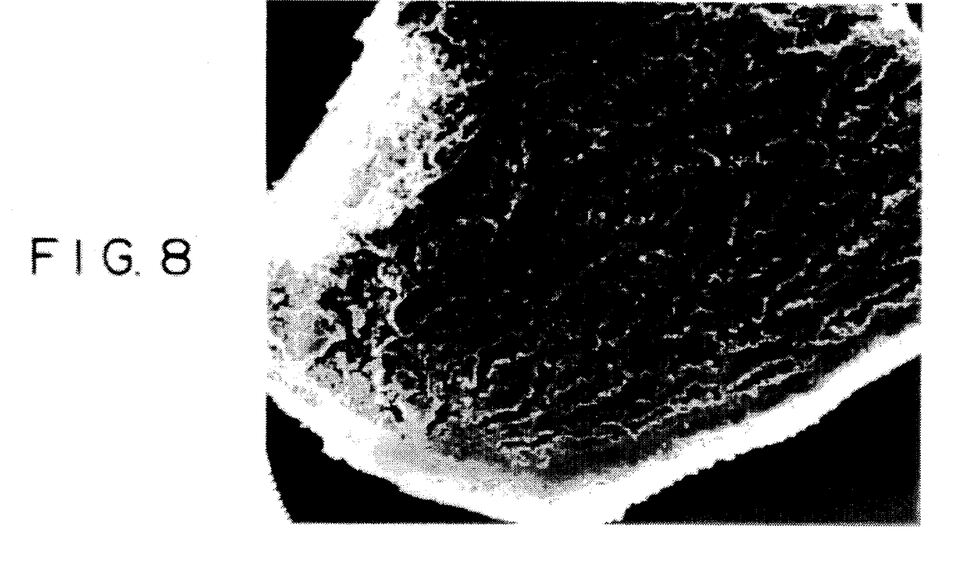
FIG. 8 shows an electron microscope photograph (×70) of each section of the same granules.

Next, the surfaces and the interiors (sections) of the dried granules were observed by an electron microscope, and at this time, the cohered fine particles having a small average particle diameter of 0.006 mm were confirmed, as shown in FIGS. 7 and 8 (photographs). A specific surface area of the dried granules was 22 m$^2$/g. The detailed conditions and results are shown in Table 1.

EXAMPLE 2

The same procedure as in Example 1 was repeated to prepare a methyl chloride solution of a polycarbonate.

Figure 3:
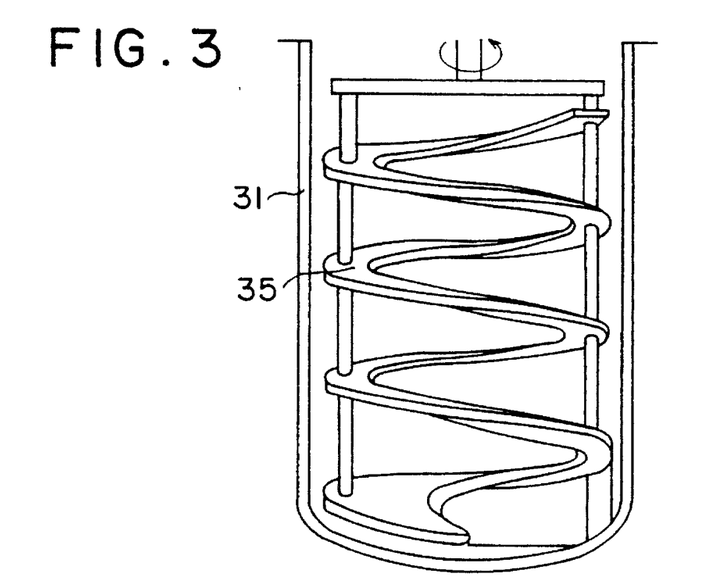
FIG. 3 shows a granulating vessel equipped with a single helical stirring blade.

Next, a vertical granulating vessel 31 having an effective volume of 6 liters and having a single helical blade 35 was prepared (FIG. 3). Steam at 120° C. was fed to a jacket (not shown) of this granulating vessel, and the above-mentioned polycarbonate solution was fed at a flow rate of 400 g/hr, while a stirring blade was rotated at 90 rpm. At this time, a shear rate F at the tip of the stirring blade had was 16 m/m.sec.

After a short time from the start of the feed of the polycarbonate solution, fine particles of the polycarbonate began to be produced, and the level of the fine particles rose. During this operation, the temperature of the fine particles layer became 83° C. At a time when the granulating vessel was filled with the fine particles, these particles were taken out therefrom, and its solvent content was measured by a weight method. As a result, it was 3.2% by weight.

Next, the temperature in the same granulating vessel containing the fine particles was maintained at 62° C., and 80 g of a mixed solvent obtained by mixing methylene chloride and n-heptane at a ratio of 3:1 was fed thereto with stirring, followed by stirring for 30 minutes.

Afterward, the particles of the polycarbonate were observed, and it was apparent that most of the initially present fine particles were converted into cohered granules alone. The granules were analyzed to determine contents and a composition of the solvents, and as a result, the content of the total solvents was 25% by weight of the granules, and specifically, contents of methylene chloride and n-heptane were 11% by weight and 14% by weight, respectively.

The obtained granules were dried in the same manner as in Example 1, and the remaining solvents were inspected. As a result, contents of methylene chloride and n-heptane were 21 ppm (weight) and 80 ppm (weight), respectively, and it was apparent that these granules were also excellent in drying properties.

A specific surface area and an average particle diameter of these granules were 18 m²/g and 1.6 mm, respectively, and it was observed that the fine particles having an average particle diameter of 0.006 mm were cohered.

The detailed conditions and results are shown in Table 1.

EXAMPLES 3 TO 8

The same procedure as in Example 1 was carried out except that a concentration of a polymer solution, an amount of n-heptane to be mixed, a rotational speed of a stirring machine and a kind of stirring blade were changed. The detailed conditions and results are shown in Table 1.

COMPARATIVE EXAMPLE 1

The same procedure as in Example 1 was carried out except that a stirring machine shown in FIG. 2 was used, a jacket temperature was set to 90° C., and a rotational speed of the stirring machine was set to 50 rpm.

A shear rate by the stirring was 5.6 m/m.sec.

Under the above-mentioned conditions, operation was carried out for 20 hours to obtain granules of a polycarbonate. The thus obtained granules had an average particle diameter of 1.3 mm, and an amount of the solvents contained in the granules was 33% by weight and specifically, contents of methylene chloride and n-heptane were 16% by weight and 17% by weight, respectively. Furthermore, the granules were dried at 135° C. for 2 hours under a nitrogen stream, and as a result, amounts of the contained solvents, that is to say, a content of methylene chloride was 860 ppm (weight) and that of n-heptane was 2300 ppm (weight).

Figure 9:
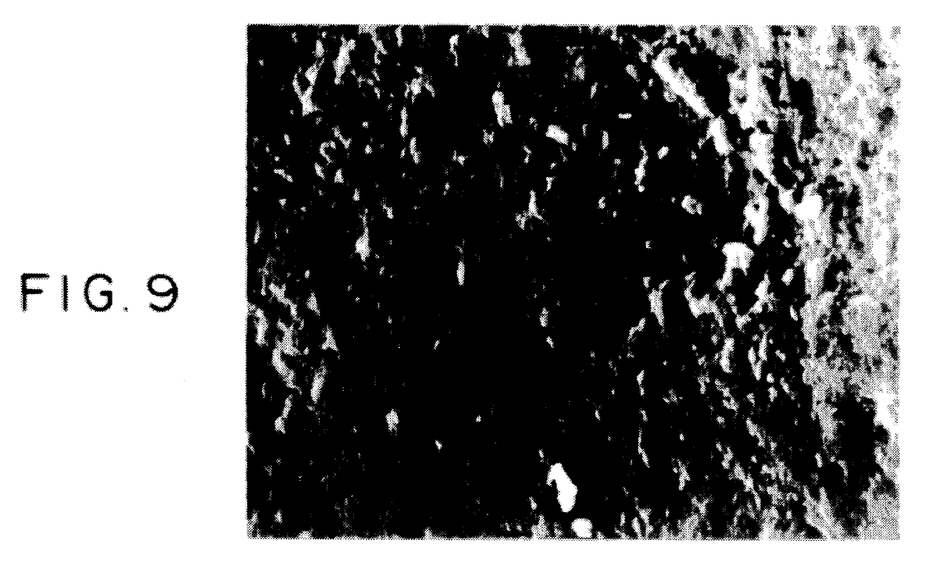
FIG. 9 shows an electron microscope photograph (×1,000) of each surface of granules obtained in Comparative Example 1.
Figure 10:
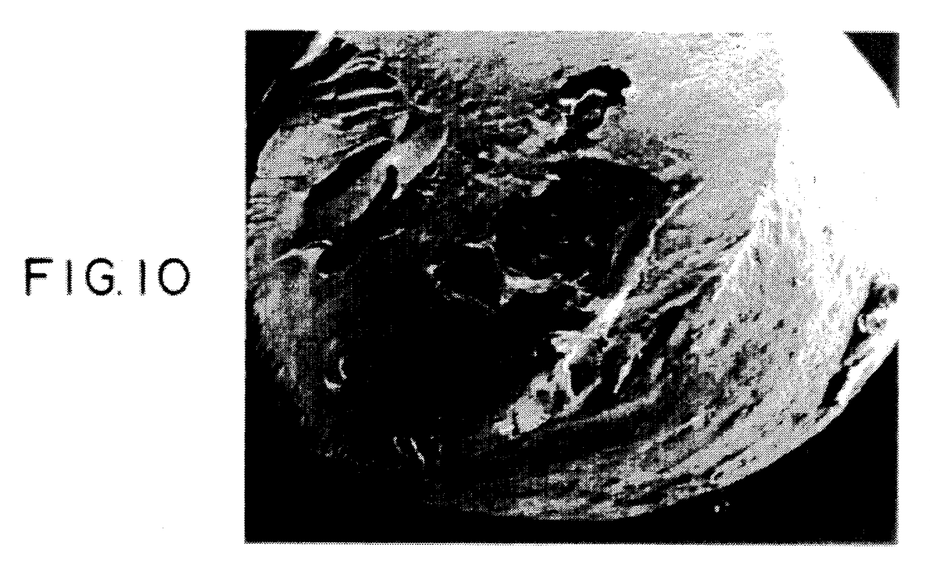
FIG. 10 shows an electron microscope photograph (×70) of each section of the same granules.

Next, surfaces and sections of the obtained granules were observed by an electron microscope, and they were confirmed as shown in FIGS. 9 and 10 (photographs). As compared with Example 1, the surfaces of the granules were smoother, and the sections showed a very dense state. The shape of the respective fine particles was not kept up, and it was apparent that any cohered particles were not formed on the whole. In addition, the specific surface area of these granules was measured, and as a result, it was 1.1 m²/g. The detailed conditions and results are shown in Table 1.

COMPARATIVE EXAMPLES 2 AND 3

The same procedure as in Example 1 was carried out except that the amount of n-heptane to be used was changed. The conditions and results are shown in Table 1.

In Comparative Example 2, any n-heptane was not used, but the particle diameter of the obtained granules merely increased with the lapse of an operation time, and so after about 10 hours of the operation time, the operation was discontinued. In addition, the drying properties of the obtained granules were quite poor.

Furthermore, in Comparative Example 3, a large amount of a poor solvent was used, but bulk density largely lowered.

A powder obtained in Comparative Example 3 had a particularly extensive particle distribution, and therefore a correlation with a particle distribution function was tried in the same manner as in Example 1. As a result, that which well matched with any distribution function was not present, and an error function value Ef (n) was $4.5\times10^{-3}$ (−) in terms of a normal distribution function curve.

COMPARATIVE EXAMPLES 4 AND 5

The same procedure as in Example 1 was carried out except that the rotational speed of a stirring machine was changed and a shear rate was largely decreased. The conditions and results are shown in Table 1.

Furthermore, in Comparative Example 4, the obtained granules had a large diameter, and drying properties of the granules deteriorated. In Comparative Example 5, a particle diameter distribution was expanded, and large cohered masses were also scatterly observed.

EXAMPLE 9

The same procedure as in Example 7 was carried out except that the rotational speed of a stirring machine was increased to 190 rpm and a shear rate was set to 63. The detailed conditions and results are shown in Table 1.

EXAMPLE 10

Figure 4:
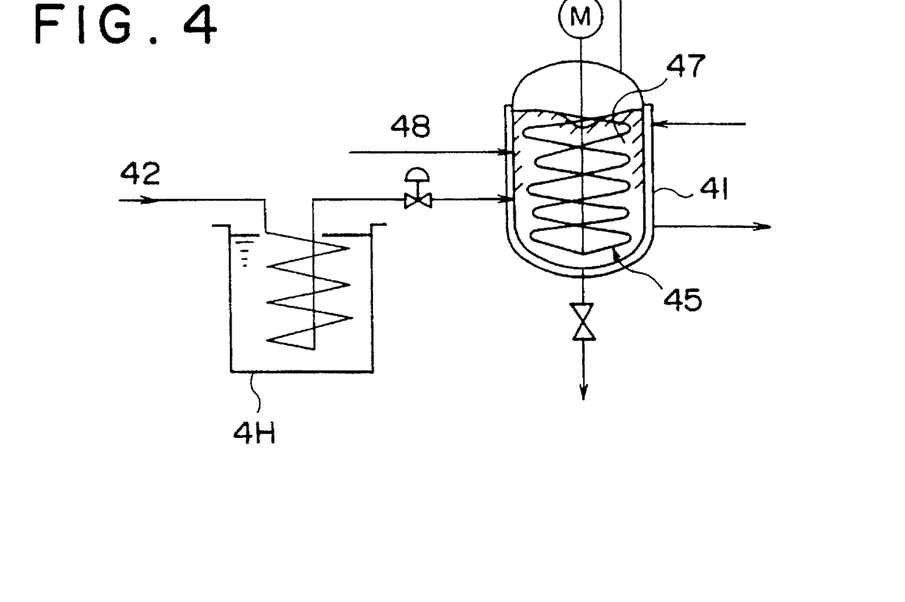
FIG. 4 shows a granulating vessel for feeding a poor solvent separately from the polymer solvent solution.

The same procedure as in Example 1 was carried out except that a polycarbonate-methylene chloride solution 42 was fed to a granulating vessel 41 having a volume of 8 liters and having a double helical blade 45 through a stainless steel coil tube attached to an oil bath 4H at 120° C. and n-heptane 48 was simultaneously fed through another feed orifice (FIG. 4). In this connection, the polycarbonate-methylene chloride solution was beforehand discharged to the atmosphere, and it was confirmed that a part of methylene chloride could be flash-vaporized to be concentrated to 45% by weight.

Under the above-mentioned conditions, continuous operation was carried out, and a temperature and an average particle diameter of produced granules 47 were 54° C. and 1.4 mm, respectively. A content of the solvents contained in the granules at the time of the production was 32% by weight, and specifically, contents of methylene chloride and n-heptane were 15% by weight and 17% by weight, respectively.

Furthermore, after drying in the same manner as in Example 1, amounts of the remaining solvents were measured. As a result, contents of methylene chloride and n-heptane were 20 ppm (weight) and 30 ppm (weight), respectively, and it was apparent that the obtained granules had good drying properties. A specific surface area and a bulk density of these granules was 25 m²/g and 0.49 g/cc, respectively. The detailed conditions and results are shown in Table 1.

EXAMPLE 11

The same procedure as in Example 1 was carried out except that n-heptane was replaced with acetone as a poor solvent. The detailed conditions and results are shown in Table 1.

EXAMPLE 12

The same procedure as in Example 1 was carried out except that n-heptane was replaced with hexane as a poor solvent. The detailed conditions and results are shown in Table 1.

TABLE 1

Feed Materials

|  | Conc. of Polymer Solution (wt %) | Feed of Polymer Solution (g/hr) | Poor Solvent | Mixing Ratio of Poor Solvent (wt %) |
| --- | --- | --- | --- | --- |
| Example 1 | 22 | 800 | n-heptane | 25 |
| Example 2 | 22 | 400 | n-heptane | 25 |
| Example 3 | 22 | 800 | n-heptane | 10 |
| Example 4 | 22 | 800 | n-heptane | 70 |
| Example 5 | 22 | 800 | n-heptane | 25 |
| Example 6 | 22 | 800 | n-heptane | 25 |
| Example 7 | 15 | 600 | n-heptane | 25 |
| Example 8 | 15 | 600 | n-heptane | 25 |
| Comp. Ex. 1 | 22 | 800 | n-heptane | 25 |
| Comp. Ex. 2 | 22 | 800 | — | 0 |
| Comp. Ex. 3 | 22 | 800 | n-heptane | 100 |
| Comp. Ex. 4 | 22 | 800 | n-heptane | 25 |
| Comp. Ex. 5 | 22 | 800 | n-heptane | 25 |
| Example 9 | 22 | 500 | n-heptane | 25 |
| Example 10 | 45 after heating and concentration | 1200 | n-heptane | 30 |
| Example 11 | 22 | 800 | Acetone | 35 |
| Example 12 | 22 | 800 | n-hexane | 55 |

Conditions of Granulation

|  | Temperature of Powder (°C.) | Kind and Volume of Stirring Vessel (liter) | Kind of Stirring Blade | Clearance (mm) | Rotational Speed (rpm) | Shear Rate F (m/m.sec) |
| --- | --- | --- | --- | --- | --- | --- |
| Example 1 | 56 | Vertical type (8) | Double helical | 10 | 120 | 36 |
| Example 2 | 62 | Vertical type (6) | Single helical | 8 | 90 | 16 |
| Example 3 | 58 | Vertical type (8) | Double helical | 10 | 120 | 36 |
| Example 4 | 65 | Vertical type (8) | Double helical | 10 | 120 | 36 |
| Example 5 | 52 | Vertical type (8) | Double helical | 10 | 50 | 15 |
| Example 6 | 55 | Vertical type (8) | Double helical | 10 | 150 | 45 |
| Example 7 | 61 | Vertical type (8) | Puddle blade | 5 | 80 | 27 |
| Example 8 | 54 | Vertical type (8) | Puddle blade | 5 | 140 | 47 |
| Comp. Ex. 1 | 60 | Vertical type (8) | Single helical | 15 | 50 | 5.6 |
| Comp. Ex. 2 | 61 | Vertical type (8) | Double helical | 10 | 120 | 36 |
| Comp. Ex. 3 | 72 | Vertical type (8) | Double helical | 10 | 120 | 36 |
| Comp. Ex. 4 | 58 | Vertical type (8) | Double helical | 10 | 30 | 9 |
| Comp. Ex. 5 | 59 | Vertical type (8) | Puddle blade | 5 | 25 | 8.3 |
| Example 9 | 62 | Vertical type (8) | Puddle blade | 5 | 190 | 63 |
| Example 10 | 54 | Vertical type (8) | Double helical | 10 | 120 | 36 |
| Example 11 | 58 | Vertical type (8) | Double helical | 10 | 120 | 36 |
| Example 12 | 52 | Vertical type (8) | Doulbe helical | 10 | 120 | 36 |

TABLE 1-continued

Characteristics of Polymer Granules

|  | Average Particle Diameter (mm) | Amount of Contained Solvent (wt %) | Amounts of MC/Poor Solvent (wt %) | Amounts of Remaining MC/Poor Solvent (wt ppm) |
| --- | --- | --- | --- | --- |
| Example 1 | 1.3 | 36 | 19/17 | 10/30 |
| Example 2 | 1.6 | 25 | 11/14 | 21/80 |
| Example 3 | 1.5 | 35 | 24/11 | 50/220 |
| Example 4 | 2.2 | 26 | 11/15 | 10/40 |
| Example 5 | 1.8 | 37 | 20/17 | 20/80 |
| Example 6 | 0.9 | 41 | 20/21 | 10/20 |
| Example 7 | 0.8 | 31 | 16/15 | 10/50 |
| Example 8 | 0.8 | 38 | 19/19 | 10/20 |
| Comp. Ex. 1 | 1.3 | 33 | 16/17 | 860/2300 |
| Comp. Ex. 2 | 4.1 | 31 | 31/— | 2.5%/— |
| Comp. Ex. 3 | 0.8 | 47 | 12/35 | 10/50 |
| Comp. Ex. 4 | 3.4 | 36 | 18/18 | 3400/2100 |
| Comp. Ex. 5 | >5/12%, <1/32% | 41 | 19/22 | 1200/2400 |
| Example 9 | 0.9 | 22 | 10/12 | 30/80 |
| Example 10 | 1.4 | 32 | 15/17 | 20/30 |
| Example 11 | 1.2 | 38 | 21/17 | 70/240 |
| Example 12 | 1.3 | 29 | 13/16 | 90/320 |

Characteristics of Polymer Granules

|  | Specific Surface Area ($m^2/g$) | Bulk Density (g/cc) | Standard Deviation σ (mm) | Wadell's Shape Factor (—) |
| --- | --- | --- | --- | --- |
| Example 1 | 22 | 0.50 | 0.27 | 0.86 |
| Example 2 | 18 | 0.55 | 0.42 | 0.88 |
| Example 3 | 12 | 0.61 | 0.33 | 0.85 |
| Example 4 | 24 | 0.45 | 0.45 | 0.86 |
| Example 5 | 8.2 | 0.51 | 0.31 | 0.86 |
| Example 6 | 19 | 0.52 | 0.19 | 0.82 |
| Example 7 | 12 | 0.51 | 0.21 | 0.84 |
| Example 8 | 21 | 0.53 | 0.23 | 0.83 |
| Comp. Ex. 1 | 1.1 | 0.56 | 0.21 | 0.87 |
| Comp. Ex. 2 | 0.5 | 0.68 | 0.19 | 0.91 |
| Comp. Ex. 3 | 31 | 0.26 | 0.65 | 0.67 |
| Comp. Ex. 4 | 0.8 | 0.59 | 1.1 | 0.73 |
| Comp. Ex. 5 | 0.5 | 0.54 | — | (0.51)*1 |
| Example 9 | 18 | 0.49 | 0.28 | 0.87 |
| Example 10 | 25 | 0.49 | 0.42 | 0.82 |
| Example 11 | 12 | 0.55 | 0.33 | 0.88 |
| Example 12 | 9 | 0.54 | 0.34 | 0.85 |

*1: An average Wadell's shape factor of the granules (n = 50) having particle diameters of 1 to 5 mm.

EXAMPLE 13

Figure 5:
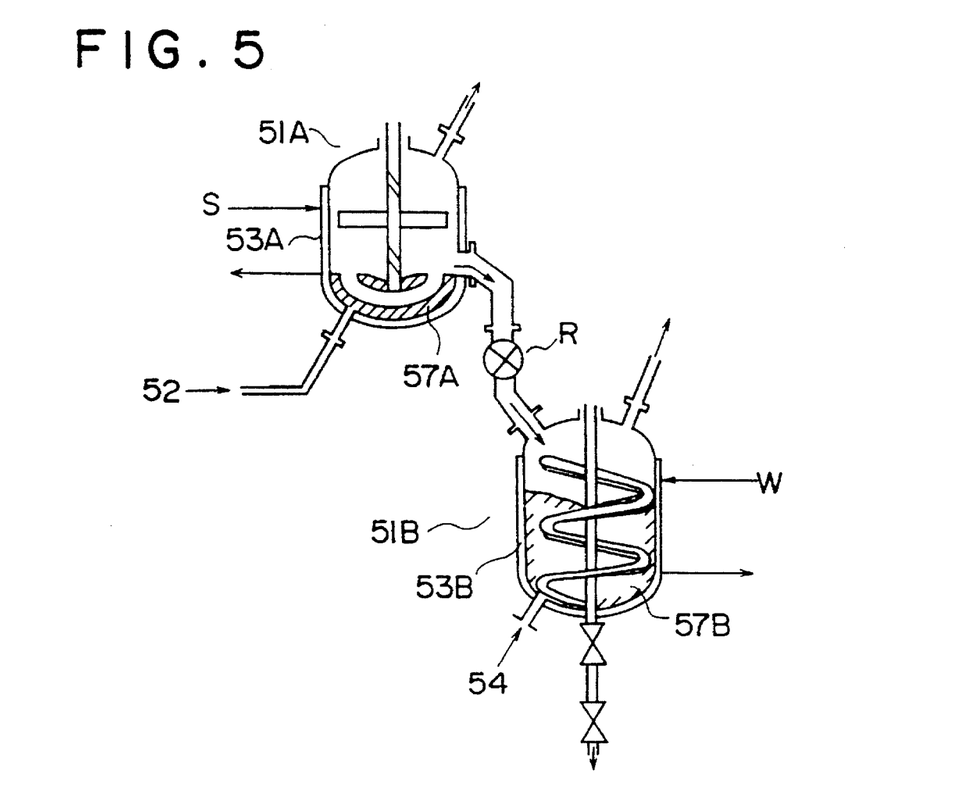
FIG. 5 shows a granulating vessel for carrying out granulation in two separated vessels.

In order to prepare fine particles and granules by adhering the fine particles, an apparatus shown in FIG. 5 was used. A first vessel A for preparing the fine particles and a second vessel B for preparing the granules were equipped with heating jackets 53A and 53B, respectively, and a rotary valve R was provided so as to continuously carry out the transport of the polymer particles from the first vessel to the second vessel.

A polycarbonate solution 52 prepared in Example 1 was fed to the first vessel with stirring at a flow rate of 500 g/hr. Steam S was fed to the jacket of the first vessel, and in this case, the flow rate of the steam was adjusted so-that a temperature of the produced fine particles 57A of the polymer might be 95° C.

After a short time, the fine particles having an average particle diameter of 0.015 mm were produced in the first vessel, and when the fine particles began to be discharged through an opening for discharge, a rotary valve was rotated to feed the fine particles to the second vessel.

In the second vessel B, warm water W was passed through the jacket, and on the other hand, a mixed solvent 54 of methylene chloride and n-heptane (the amount of n-heptane was 25% by weight based on the weight of methylene chloride) was fed as a binder at a flow rate of 250 g/hr to the polymer fine particles which was being stirred. During this operation, a temperature of the fine particles of the polymer was constant at 53° C. After the start of this operation, also in the second vessel, cohered granules 57B having an average particle diameter of 1.4 mm began to be produced, and at this time, the produced granules began to be drawn so that the level of the granules in the vessel might be constant by the utilization of a lower valve.

In the first and second vessels, contents of the solvents contained in the produced fine particles and granules were measured, and as a result, it was apparent that in the first vessel, the contents of methylene chloride and n-heptane were 0.5% by weight and 1.1% by weight, respectively, and in the second vessel, the contents of methylene chloride and n-heptane were 18% by weight and 23% by weight, respectively.

The granules discharged from the second vessel were dried in the same manner as in Example 1, and contents of the remaining solvents were measured. As a result, the contents of methylene chloride and n-heptane were low, 15 ppm (weight) and 120 ppm, respectively. In addition, a specific surface area of these granules was 12 m²/g.

EXAMPLE 14

Figure 6:
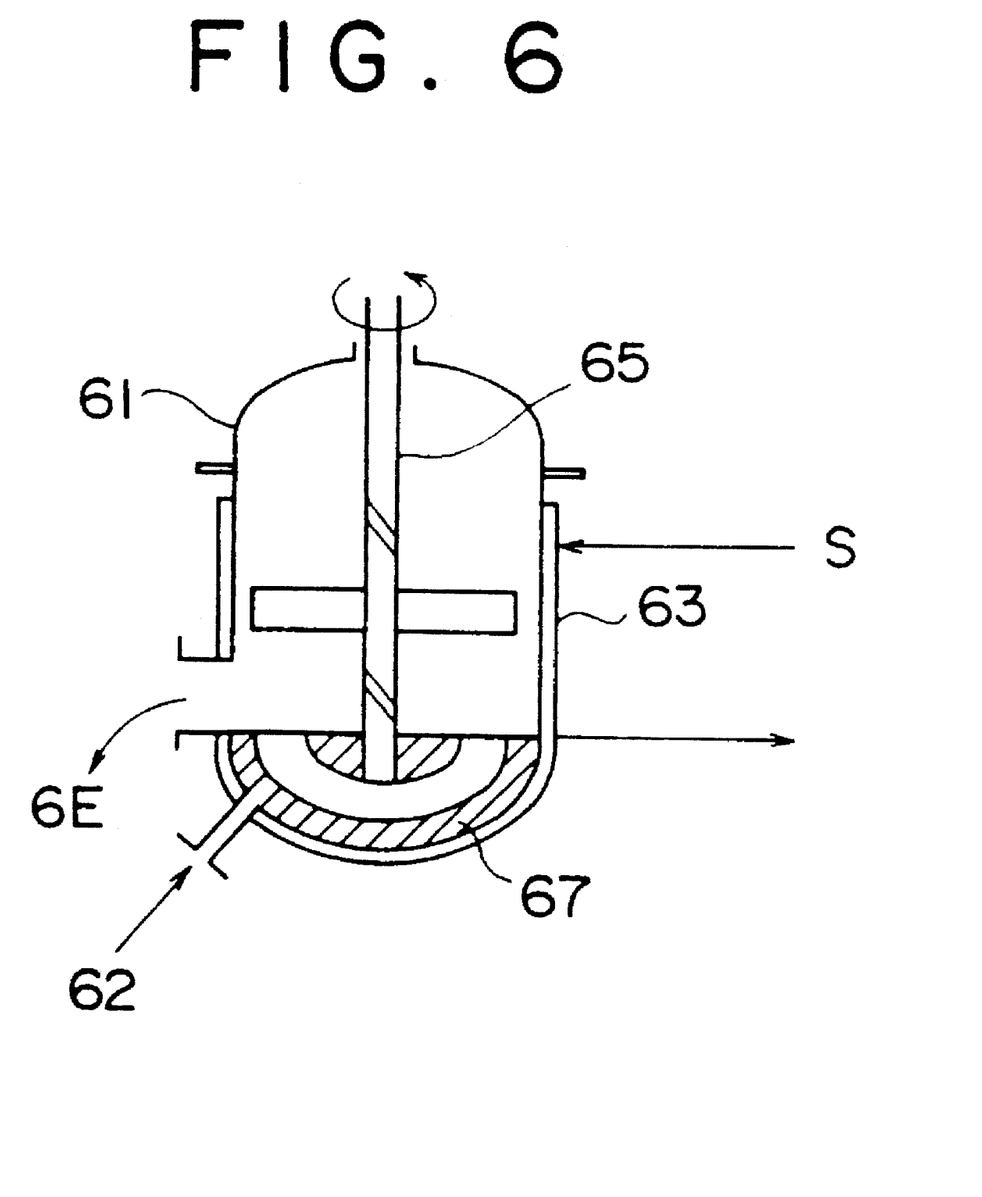
FIG. 6 shows a granulating vessel for inspecting the production state of fine particles.

Steam S at 120° C. was fed to a jacket 63 of a granulating vessel 61 (a gap between a stirring blade and a vessel wall was 10 mm) having an effective volume of 8 liters equipped with a stirring machine 65 having a paddle blade shown in FIG. 6, and a polycarbonate solvent solution 62 prepared in the same manner as described in Example 1 was fed thereto with stirring at a flow rate of 400 g/hr. During the above-mentioned stirring operation, a shear rate F of the stirring blade was 16 m/m.sec.

After a short time from the start of the feed, fine particles 67 began to be produced in the granulating vessel, and the produced fine particles were rapidly drawn through a drawing orifice 6E provided through a side wall of the granulating vessel. At this time, a temperature of the fine particles in the vessel was 92° C., and a content of the remaining solvents was 1.1% by weight (specifically, the contents of methylene chloride and n-heptane were 0.4% by weight and 0.7% by weight, respectively).

It is apparent that if suitable heating is given to the system while a predetermined or more shear force is applied, the fine particles can be produced.

What is claimed is:

1. Polymer granules collected from a solvent solution of a polymer selected from the group consisting of a polycarbonate, a polyarylate, a polyesterpolycarbonate and a polyamide, at least the surfaces of said granules having an integrated structure of independent fine particles of the polymer having an average particle diameter within the range of 0.001 to 0.2 mm and a sphericalness of the granules within the range of 0.8 to 1.0 in terms of Wadell's shape factor.

2. Polymer granules collected from a solvent solution of a polymer selected from the group consisting of a polycarbonate, polyarylate, a polyesterpolycarbonate and a polyamide, said granules having been formed by cohesion of fine particles of the polymer having particle diameters within the range of 0.001 to 0.2 mm and a sphericalness of the granules within the range of 0.8 to 1.0 in terms of Wadell's shape factor, while the morphology of the fine particles is maintained.

3. The polymer granules collected from a good organic solvent solution of a polymer according to claim 1 or 2 wherein the weight distribution of the granules to the particle diameter (X mm) is represented by the formula (I)

$$D(X) = \frac{1}{\sigma\sqrt{2\pi}} \int_{-\infty}^{x} \exp\left(\frac{-(X-X_{bar})^2}{2\sigma^2}\right) dX \quad (I)$$

and this distribution is such that Ef (measurement numbers =n) represented by the formula (II)

$$Ef = \frac{\Sigma(D(X)_{calc} - D(X))^2}{n} \quad (II)$$

is $3\times10^{-4}$ or less which substantially corresponds to a normal distribution, and the granules have a standard deviation $\sigma \leq 0.5$ and $0.3 \leq$ bulk density (g/cc) $\leq 0.7$.

4. The polymer granules according to claim 1 or 2 wherein a specific surface area of the granules of the polymer is in the range of 1 to 100 m²/g.

5. The polymer granules according to claim 1 or 2 wherein the particle diameter of the granules of the polymer is in the range of 0.5 to 5 mm.

6. The polymer granules according to claim 1 or 2 wherein the bulk density of the polymer granules is in the range of 0.3 to 0.7 g/cc.

7. The polymer granules according to claim 1 or 2 wherein the polymer has an ester bond on its main chain.

8. The polymer granules according to claim 7 wherein the polymer having the ester bond on the main chain is a polycarbonate.

9. A process for preparing polymer granules, which comprises the steps of:
   adding from 5 to 80% by weight of a poor solvent, as determined by the expression: poor solvent amount× 100/{amount of solvent solution ×(1−a polymer solution concentration (%)/100), to a good organic solvent solution of the polymer, in which the concentration of polymer ranges from 3 to 60% by weight, and then
   agitation-granulating fine particles of the polymer into granules, while stirring to subject the particles of polymer to a shear rate of 10 to 80 m/m.sec, which is carried out under a heated atmosphere.

10. A process for preparing polymer granules, which comprises the steps of:
   adding from 5 to 80% by weight of a poor solvent, as determined by the expression: poor solvent amount× 100/{amount of solvent solution×(1−a polymer solution concentration (%)/100), to a good organic solvent solution of the polymer, in which the concentration of polymer ranges from 3 to 60% by weight, carrying out stirring to subject the particles of polymer to a shear rate of 10 to 80 m/m.sec under a heated atmosphere to form fine particles of the polymer, and then agitation-granulating the granules of the polymer.

11. The process for preparing polymer granules according to claim 9 or 10 wherein the amount of the poor solvent to be used is such as to be a poor solvent amount× 100/{a polymer solution amount×(1−a polymer solution concentration (%)/100}=5 to 80.

12. The process for preparing polymer granules according to claim 9 or 10 wherein the poor solvent is n-heptane.

13. The process for preparing polymer granules according to claim 9 or 10, wherein the formation of the fine polymer particles by stirring to subject the particles to the shear force and agitation-granulation are carried out in the same granulating vessel.

14. The process for preparing polymer granules according to claim 9 or 10, wherein the granulation of fine polymer particles by stirring to subject the particles to the shear force and agitation-granulation are carried out in a granulating vessel having a single or double helical rotating blade.

* * * * *